A. M. BRENNE.
CENTER BEARING FOR CARS.
APPLICATION FILED OCT. 17, 1921.
1,431,284.
Patented Oct. 10, 1922.
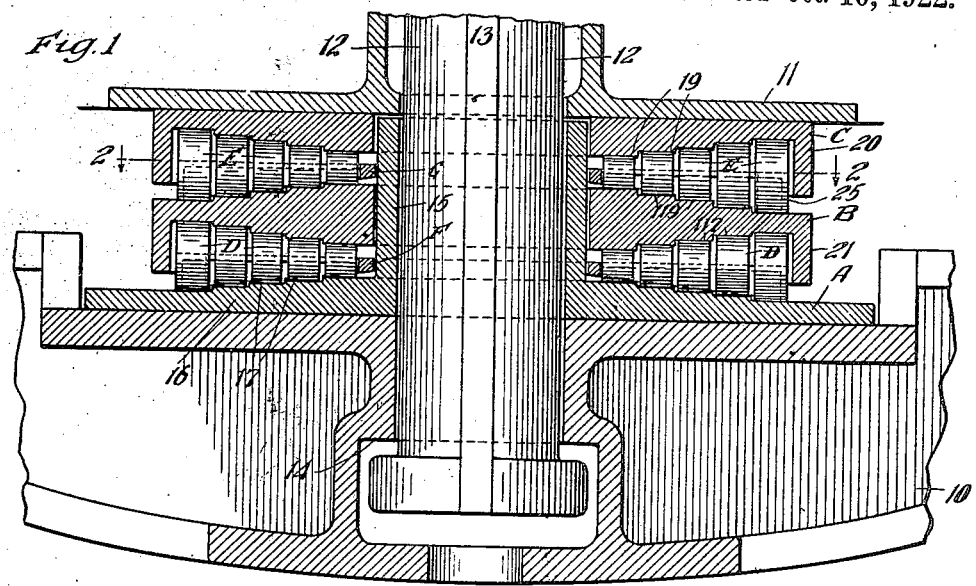
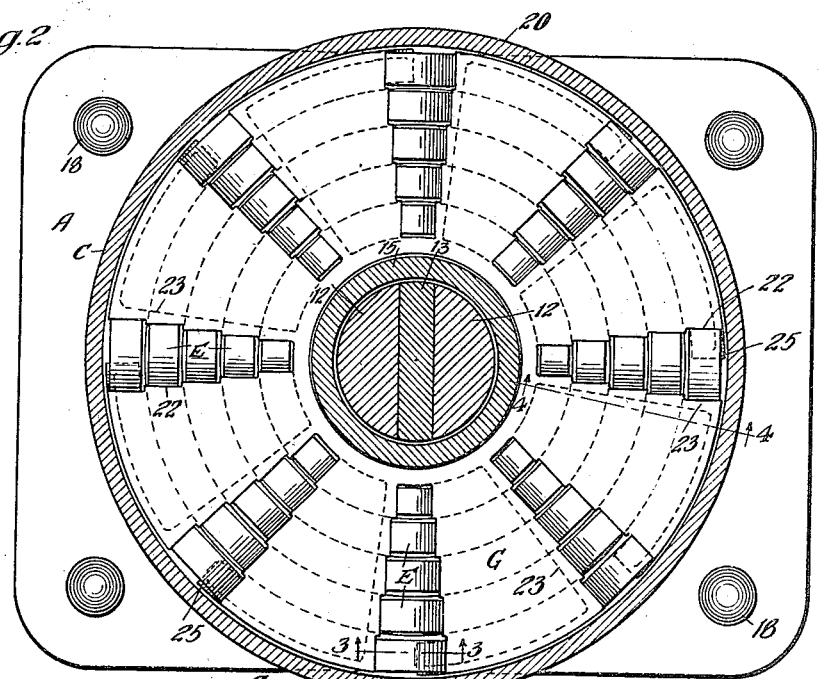
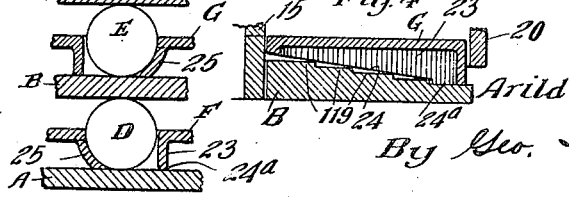
Witnesses
Wm. Geiger
Inventor
Arild M. Brenne
By Geo. I. Haight
His Atty.

Patented Oct. 10, 1922.

1,431,284

UNITED STATES PATENT OFFICE.

ARILD M. BRENNE, OF CHICAGO, ILLINOIS, ASSIGNOR TO WILLIAM H. MINER, OF CHAZY, NEW YORK.

CENTER BEARING FOR CARS.

Application filed October 17, 1921. Serial No. 508,289.

*To all whom it may concern:*

Be it known that I, ARILD M. BRENNE, a citizen of the United States, residing at Chicago, in the county of Cook and State of Illinois, have invented a certain new and useful Improvement in Center Bearings for Cars, of which the following is a full, clear, concise, and exact description, reference being had to the accompanying drawings, forming a part of this specification.

This invention relates to improvements in center bearings for cars.

One object of the invention is to provide an efficient and durable substantial center bearing of the anti-friction type for railway cars and wherein end thrust on the anti-friction rollers is minimized.

Another object of the invention is to provide a center bearing of the character above indicated, wherein are employed two series of anti-friction rollers combined with simple and effective means to compel one of the series of rollers to travel always in one direction and the other series to travel always in the opposite direction to thereby eliminate uneven wear and flat spots on the rollers.

Other objects of the invention will more clearly appear from the description and claims hereinafter.

In the drawing forming a part of this specification, Figure 1 is a vertical sectional view taken transversely of a railway car through the king pin thereof and illustrating my improved center bearing in connection therewith. Fig. 2 is a horizontal sectional view corresponding substantially to the line 2—2 of Fig. 1. Fig. 3 is a detail sectional view corresponding to the section line 3—3 of Fig. 2. And Fig. 4 is a radial sectional view corresponding substantially to the line 4—4 of Fig. 2 but illustrating only so much of the arrangement as relates to one of the series of anti-friction rollers.

In said drawing, 10 denotes a truck bolster of a car and 11 a portion of the corresponding body bolster. The two bolsters are pivotally connected by a king pin which, in the instance shown, consists of two semi-cylindrical elements 12—12 and a central spreader key 13. The ends of the elements 12—12 are flanged laterally at the top and bottom so as to overlie corresponding shoulders of the body and truck bolsters, the shoulders of the truck bolster being indicated at 14. In this manner vertical separation of the body and truck bolsters is prevented in a manner now fully understood in the art.

The improved center bearing, as shown, is interposed between the body and truck bolsters and comprises, broadly, a lower annular bearing plate A; an intermediate annular bearing plate B; an upper annular bearing plate C; a lower series of anti-friction rollers designated generally by the reference D; an upper series of anti-friction rollers designated generally by the reference E; a lower chock plate F and an upper chock plate G.

The bottom bearing plate A is of angular cross-section as clearly shown in Fig. 1 and has an inner vertically extending circular flange 15 and bottom horizontally extending flange 16. The top face of the flange 16 is provided with a series of outwardly and downwardly stepped bearing surfaces 17—17. Said bearing plate A sets upon and is preferably rigidly secured to the upper portion of the truck bolster 10 as by the rivets 18—18.

The bearing plate C is similar with respect to the stepped circular bearing surfaces 19—19 except that the latter are stepped outwardly and upwardly. Said top bearing plate C telescopes over the flange 15 and at its outer end has a depending circular flange 20.

The intermediate bearing plate B is of annular form and has a series of outwardly and upwardly stepped bearing surfaces 117—117 on its underside and a series of outwardly and downwardly stepped bearing surfaces 119—119 on its upper face. At its outer edge, the plate B is provided with a depending circular flange 21 as shown in Fig. 1.

Each of the series of rollers D and E comprises a plurality of radially arranged sets, there being five rollers in each set as shown in the drawing. The radial sets are also angularly offset uniformly, there being eight sets in each series as clearly shown in Fig. 2.

As is well known, when two plates of a bearing or the like are rotated relative to each other, the surface speeds thereof vary proportional to the distance from the center of rotation. Heretofore, when anti-friction rollers of common diameter have been used, it is evident that the outermost roller must travel at a faster rate than the innermost one and consequently there has been a tendency toward radial outward end thrust due to the different surface speeds at varying distance from the center. With my arrangement, the bearing surfaces and the diameters of the rollers are so related that the surface speeds are made proportional to the distance from the center of the bolsters, the innermost or smallest diameter rollers having a diameter approximately three-quarters of an inch at a distance of two and one-quarter inches from the center of rotation; the outermost or largest diameter rollers being approximately two inches in diameter at a distance of six and one-quarter inches from the center of rotation; and the intermediate rollers being of proportionately increasing diameter outwardly. In this manner, I minimize the tendency of end thrust and minimize friction on the ends of the individual rollers.

In the operation of railroad cars, it is well known that the trucks turn first to one side and then to the opposite side with respect to the body of the car when the car strikes a curve, the truck being then returned to central position when the car runs back onto a tangent. The amount of turning of the truck is comparatively small and in order to avoid concentration of the wear on small areas of the rollers and bearing plates, I provide means for compelling one series of rollers to travel always in one direction and the other series always in the opposite direction regardless of the sequence of the turning movements of the truck with respect to the car. These means are found in the chocking plates F and G which are of like construction but oppositely arranged. Each plate F is of annular form adapted to fit loosely between the circular flange 15 and either one of the outer flanges 20 and 21. Each plate F is recessed as indicated at 22 in a radially inwardly stepped series corresponding to the diameters of the rollers of each set so that the plate is adapted to accommodate the rollers in the openings 22 thereof. On one side of each opening 22 the metal of the plate is extended in a depending vertical flange as indicated at 23, having a sloping bottom 24 which rides on the edges of the steps of the corresponding bearing plate A or B. With this construction, it will be noted that the friction between the chocking plates and the supporting bearing plates is reduced to a minimum. The outermost edge of each flange 23 is left horizontal as indicated at 24ª in Fig. 4 so as to avoid tendency of the chocking plate to tilt. Each chocking plate at the outer end of each recess 22 therein opposite the largest diameter roller only, is provided with a downwardly curved flange as indicated at 25 in Fig. 3 conforming approximately to the curvature of the adjacent roller and adapted to wedge between it and the corresponding bearing plate beneath when the roller is moved in one direction. Said flanges 25 of the two plates F and G are oppositely arranged as clearly indicated in Fig. 3, so that as viewed in Fig. 3, the lower roller may travel toward the right only and the upper roller toward the left only. By employing only a single flange 25 for each set of the rollers, I obtain the necessary chocking effect and avoid any undue complication of the structure and excessive interference with the free action of the rollers. With the arrangement just described, it is evident that the lower series of rollers D will travel in a counter clockwise direction, as viewed in Fig. 2 and the upper series of rollers E will travel in a clockwise direction. Consequently, with this arrangement, the position of the rollers is constantly shifted and danger of flat spots being worn in the rollers or indentation of the bearing surfaces at particular points, is reduced to a minimum.

I have herein shown and described what I now consider the preferred manner of carrying out the invention but the same is merely illustrative and I contemplate all changes and modifications that come within the scope of the claims appended hereto.

I claim:

1. In an anti-friction center bearing for cars adapted to be placed between the body and truck bolsters thereof, the combination with an annular, outwardly and downwardly stepped bottom bearing plate; of a series of sets of anti-friction rollers arranged to travel circularly on said bearing plate, each set comprising a plurality of rollers arranged radially and of outwardly progressively larger diameters approximately proportional to the distance from the center of the bearing, said sets being angularly spaced; and an annular bearing plate on top of said rollers and having its underside outwardly and upwardly stepped to correspond with the different diameter rollers.

2. In an anti-friction center bearing for cars adapted to be placed between the body and truck bolsters thereof, the combination with an annular outwardly and downwardly stepped bottom bearing plate; of an annular outwardly and upwardly stepped top bearing plate; an intermediate annular bearing plate having the top thereof provided with outwardly downwardly stepped bearing surfaces and the bottom thereof provided with outwardly and upwardly stepped surfaces; and upper and lower series of sets of anti-friction rollers cooperable with said bearing plates, each set of rollers comprising a plurality of rollers arranged radially and of outwardly progressively larger diameters approximately proportional to the distance from the center of bearing.

3. In an anti-friction center bearing for cars adapted to be placed between the body and truck bolsters thereof, the combination with an annular outwardly and downwardly stepped bottom bearing plate; of an annular outwardly and upwardly stepped top bearing plate; an intermediate annular bearing plate having the top thereof provided with outwardly downwardly stepped bearing surfaces and the bottom thereof provided with outwardly and upwardly stepped surfaces; upper and lower series of sets of anti-friction rollers cooperable with said bearing plates, each set of rollers comprising a plurality of rollers arranged radially and of outwardly progressively larger diameters approximately proportional to the distance from the center of bearing; and oppositely acting chocking means cooperable with each series of rollers.

4. In an anti-friction center bearing for cars adapted to be placed between the body and truck bolsters thereof, the combination with an annular outwardly and downwardly stepped bottom bearing plate; of an annular outwardly and upwardly stepped top bearing plate; an intermediate annular bearing plate having the top thereof provided with outwardly downwardly stepped bearing surfaces and the bottom thereof provided with outwardly and upwardly stepped surfaces; upper and lower series of sets of anti-friction rollers cooperable with said bearing plates, each set of rollers comprising a plurality of rollers arranged radially and of outwardly progresively larger diameters approximately proportional to the distance from the center of bearing; and a chocking plate cooperable with each series of rollers, one chocking plate acting in the reverse direction to the other.

5. In an anti-friction center bearing for cars adapted to be placed between the body and truck bolsters thereof, the combination with an annular outwardly and downwardly stepped bottom bearing plate; of an annular outwardly and upwardly stepped top bearing plate; an intermediate annular bearing plate having the top thereof provided with outwardly downwardly stepped bearing surfaces and the bottom thereof provided with outwardly and upwardly stepped surfaces; upper and lower series of sets of anti-friction rollers cooperable with said bearing plates, each set of rollers comprising a plurality of rollers arranged radially and of outwardly progresively larger diameters approximately proportional to the distance from the center of bearing; and a chocking plate cooperable with each series of rollers, each chocking plate having a series of radially arranged openings to accommodate the rollers of each set of the series, said chocking plate having a chocking flange cooperable with the outermost roller of each set, the chocking flanges of one plate being arranged oppositely to the chocking flanges of the other plate.

6. In a center bearing for railway cars adapted to be interposed between the body and truck bolsters thereof, the combination with a lower annular bearing plate having an up-standing circular flange at its inner edge and a horizontally extending bottom flange provided with a plurality of outwardly and downwardly stepped bearing surfaces on the top side thereof; of a series of anti-friction rollers mounted on said bearing plate, said series comprising a plurality of radially arranged sets of rollers of outwardly progressively larger diameters; an annular intermediate bearing plate on top of said series of rollers and having its underside formed with a series of outwardly and upwardly stepped bearing surfaces, said intermediate plate having a depending circular flange around its outer edge, the upper side of said intermediate bearing plate being formed with a series of outwardly and downwardly stepped bearing surfaces; an upper series of anti-friction rollers mounted on said intermediate bearing plate, said series comprising a plurality of radially arranged sets of outwardly progressively larger diameters; and a top bearing plate having the underside thereof formed with a series of outwardly and upwardly stepped bearing surfaces, said top bearing plate having a depending circular flange around the outer edge thereof.

7. In a center bearing for railway cars adapted to be interposed between the body and truck bolsters thereof, the combination with a lower annular bearing plate having an up-standing circular flange at its inner edge and a horizontally extending bottom flange provided with a plurality of outwardly and downwardly stepped bearing surfaces on the top side thereof; of a series of anti-friction rollers mounted on said bearing plate, said series comprising a plurality of radially arranged sets of rollers of outwardly progressively larger diameters; an annular intermediate bearing plate on top of said series of rollers and having its underside formed with a series of outwardly and upwardly stepped bearing surfaces, said intermediate plate having a depending circular flange around its outer edge, the upper side of said intermediate bearing plate being formed with a series of outwardly and downwardly stepped bearing surfaces; an upper series of anti-friction rollers mounted on said intermediate bearing plate, said series comprising a plurality of radially arranged sets of outwardly progressively larger diameters; a top bearing plate having the underside thereof formed with a series of outwardly and upwardly stepped bearing surfaces, said top bearing plate having a depending circular flange around the outer edge thereof; and a chocking plate cooperable with each series of rollers, each chocking plate having openings therein to accommodate the rollers of each set of the series, each chocking plate also having a downwardly extending chocking flange cooperable with the outermost roller of each set, the chocking flanges of one plate being arranged oppositely to those of the other plate.

In witness that I claim the foregoing I have hereunto subscribed my name this 11th day of Oct., 1921.

ARILD M. BRENNE.

Witnesses:
CARRIE GAILING,
ANN BAKER.